United States Patent [19]

Matsugu et al.

[11] Patent Number: 5,734,743
[45] Date of Patent: Mar. 31, 1998

[54] IMAGE PROCESSING METHOD AND APPARATUS FOR BLOCK-BASED CORRESPONDING POINT EXTRACTION

[75] Inventors: Masakazu Matsugu, Oamishirasato-machi; Katsumi Iijima, Hachioji, both of Japan

[73] Assignee: Canon Kabushiki Kaisha, Tokyo, Japan

[21] Appl. No.: 503,405

[22] Filed: Jul. 11, 1995

[30] Foreign Application Priority Data

Jul. 12, 1994 [JP] Japan ............................. 6-160148

[51] Int. Cl.$^6$ ............................................. G06T 9/20
[52] U.S. Cl. ................................... 382/154; 382/173
[58] Field of Search ........................... 382/154, 106, 382/107, 278, 294, 291, 173; 348/139, 47, 50; 356/3.14, 12; 395/119, 125

[56] References Cited

U.S. PATENT DOCUMENTS 4,700,398  10/1987  Mizuno et al. ..................... 382/154
4,825,393   4/1989  Nishiya ............................... 392/154

OTHER PUBLICATIONS

L.H. Quam, "Hierarchical Warp Stereo", Proc. of DARPA Image Understanding Workshop, pp. 149–155 (1984); reprinted with permission of DARPA and the author in M.A. Fischler, Readings in Computer Vision: Issues, Problems, Principles, and Paradigms, pp. 80–86 (1987).

T. Kanado and M. Okutomo, "A Stereo Matching Algorithm with an Adaptive Window: Theory and Experiment," Proc. of International Conference on Computer Vision, pp. 383–388 (1990).

*Primary Examiner*—Leo Boudreau
*Assistant Examiner*—Brian P. Werner
*Attorney, Agent, or Firm*—Morgan & Finnegan, LLP

[57] ABSTRACT

An image processing method and apparatus for block-based corresponding-point extraction with high-precision, even if an image includes a discontinuous portion. The method comprises an extraction step of extracting edges or outline of a plurality of images, a dividing step of dividing the images into a plurality of blocks in such a manner that every block contains no edge and the sides of every block do not intersect with an edge, and a corresponding-point determination step of determining corresponding points between the images, based on similarity between one block of one image and a corresponding block of another image. Thus, even if one of the images includes a discontinuous portion, the corresponding-point extraction can be smoothly performed.

74 Claims, 7 Drawing Sheets

IMAGE PROCESSING METHOD AND APPARATUS FOR BLOCK-BASED CORRESPONDING POINT EXTRACTION

BACKGROUND OF THE INVENTION

Present invention relates to an image processing method and apparatus and, more particularly to a corresponding-point matching method and apparatus for obtaining binocular disparities or depth, or motion vectors or velocity vectors, by extracting corresponding points between, e.g., two images.

Conventionally, a variety of methods for obtaining depth (distance) information or motion vector information or velocity vector information from two images have been proposed. In such methods, the images are obtained by two cameras arranged a predetermined distance therebetween and from the object, and at a predetermined convergence angle; or obtained by a single-lens camera at different time points or from different image-sensing positions. Then, corresponding points between the images are extracted, and depth (distance) information or motion vector information or velocity vector information is obtained using the relative position vectors or parallaxes of the corresponding points.

The most popular method is to respectively divide two images into blocks with a predetermined block size, and extract, as corresponding points, the central pixels between a pair of blocks having the highest similarity among the other pairs of blocks, based on the correlation between the blocks or the square products of the difference of luminance between the two images and their sum.

Among recently-proposed methods, a method to limit an extraction range based on a rough correspondence, by dividing images into large blocks at first, then gradually reducing the block size is known (Quam, "Hierarchical Warp Stereo", Proc. of the DARPA Image Understanding Workshop pp. 149–155 (1984)).

Also, a correlation-based method to change the block size in accordance with variance of intensity distribution is known (Kanade & Okutomi, "A Stereo Matching Algorithm with an Adaptive Window", Theory and Experiment, Proc. of International conference on Computer Vision, pp. 383–388 (1990)).

However, in the above conventional methods, if one block in one image has a discontinuously changing portion in depth, where the depths of the portion viewed from the camera discontinues, or a portion where occlusion occurs, or if one image has a portion where velocity vectors change discontinuously, or if the corresponding image does not have the other corresponding portion, the conventional methods cannot correctly locate corresponding points based on the correlation between blocks and the like.

SUMMARY OF THE INVENTION

The present invention has been made in consideration of the above situation, and has as its object to perform corresponding-point extraction with high precision in block units, even if a discontinuous portion exists in an image.

The foregoing object is attained by providing an image processing method for processing images for stereoscopic vision, obtained by image-sensing an object from a plurality of view points, comprising:

a division step of dividing the respective images into a plurality of blocks so as not to intersect each block's side with any edges in the images; and a corresponding-point determination step of determining corresponding points between the images, each having blocks generated in said division step, based on similarity, each between one block of one image and that of another image.

Further, the foregoing object is attained by providing an image processing method of processing motion images obtained by image-sensing an object at different time points, comprising:

a division step of dividing frame images of the motion images, each into a plurality of blocks, so as not to intersect each block's side with any edges in the images; and a corresponding-point determination step of determining corresponding points between the frame images, based on similarity between one block of one frame image and that of a corresponding frame image.

Further, the foregoing object is attained by providing an image processing method for processing images for stereoscopic vision, obtained by image-sensing an object from a plurality of view points, comprising:

a division step of dividing the respective images into a plurality of blocks so as not to intersect each block's side with any edges in the images and so as not to include adjacent pixels whose binocular disparities differ from each other by more than a predetermined threshold value and a corresponding-point determination step of determining corresponding points between the images, each having blocks generated in said division step, based on similarity, each between one block of one image and that of another image.

Further, the foregoing object is attained by providing an image processing method for processing motion images, obtained by image-sensing an object at different time points, comprising:

a division step of dividing the respective images into a plurality of blocks so as not to intersect each block's side with any edges in the images and so as not to include adjacent pixels whose motion vectors differ from each other by more than a predetermined threshold value and a corresponding-point determination step of determining corresponding points between the images, each having blocks generated in said division step, based on similarity, each between one block of one image and that of another image.

Further, the foregoing object is attained by providing an image processing apparatus for processing images for stereoscopic vision, obtained by image-sensing an object from a plurality of view points, comprising:

a division means for dividing the respective images into a plurality of blocks so as not to intersect each block's side with any edges in the images; and a corresponding-point determination means for determining corresponding points between the images, each having blocks generated in said division means, based on similarity, each between one block of one image and that of another image.

Further, the foregoing object is attained by providing an image processing apparatus of processing motion images obtained by image-sensing an object at different time points, comprising:

a division means for dividing frame images of the motion images, each into a plurality of blocks, so as not to intersect each block's side with any edges in the images; and a corresponding-point determination means for determining corresponding points between the frame images, based on similarity between one block of one frame image and that of a corresponding frame image.

Further, the foregoing object is attained by providing an image processing apparatus for processing images for stereoscopic vision, obtained by image-sensing an object from a plurality of view points, comprising:

a division means for dividing the respective images into a plurality of blocks so as not to intersect each block's side with any edges in the images and so as not to include adjacent pixels whose binocular disparities differ from each other by more than a predetermined threshold value and a corresponding-point determination means for determining corresponding points between the images, each having blocks generated in said division means, based on similarity, each between one block of one image and that of another image.

Further, the foregoing object is attained by providing an image processing apparatus for processing motion images, obtained by image-sensing an object at different time points, comprising:

a division means for dividing the respective images into a plurality of blocks so as not to intersect each block's side with any edges in the images and so as not to include adjacent pixels whose motion vectors differ from each other by more than a predetermined threshold value and a corresponding-point determination means for determining corresponding points between the images, each having blocks generated in said division means, based on similarity, each between one block of one image and that of another image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

[First Embodiment]

Figure 1:
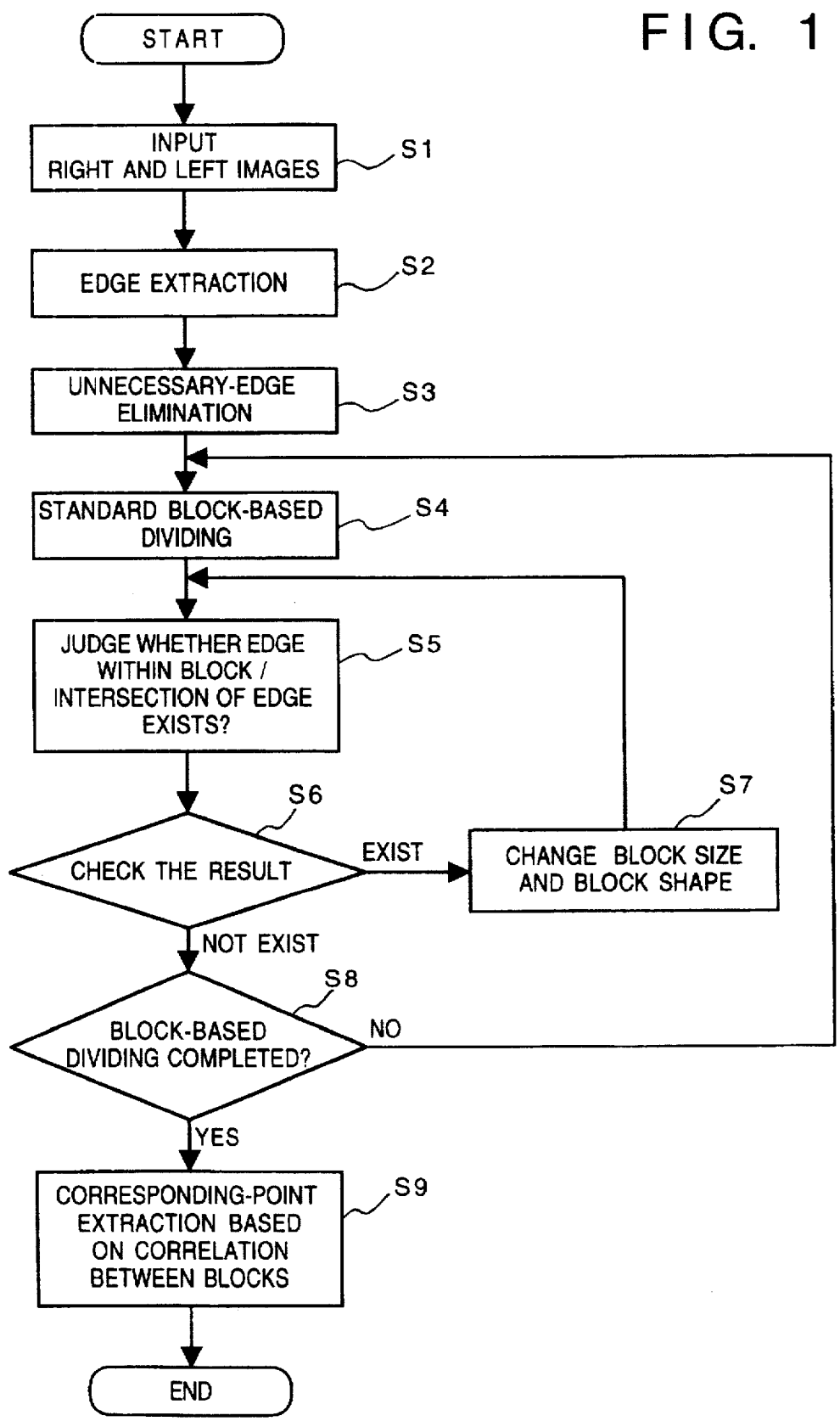
FIG. 1 is a flowchart showing processing procedure according to a first embodiment of the present invention.
Figure 4:
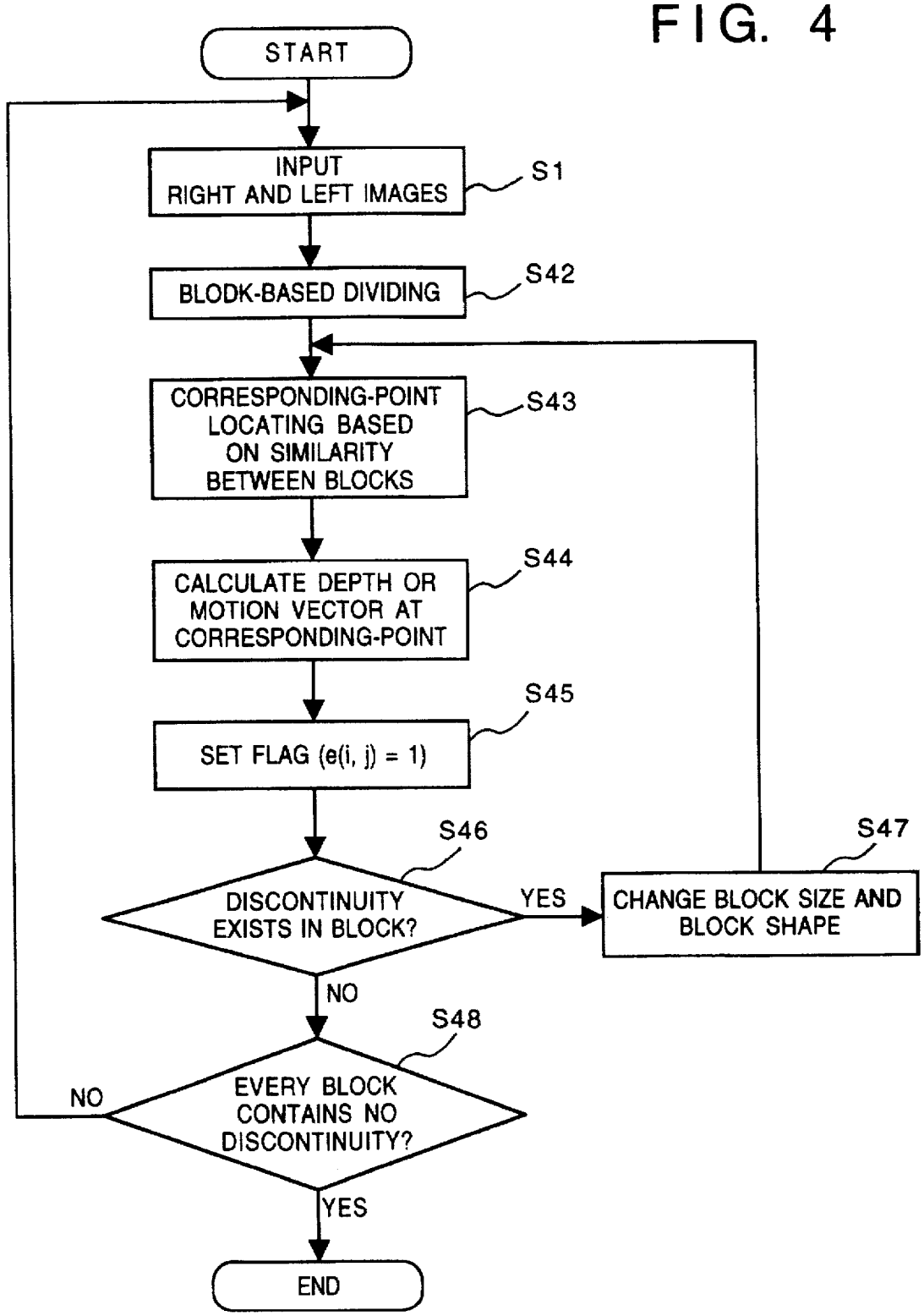
FIG. 4 is a flowchart showing processing procedure according to a fourth embodiment of the present invention.
Figure 5:
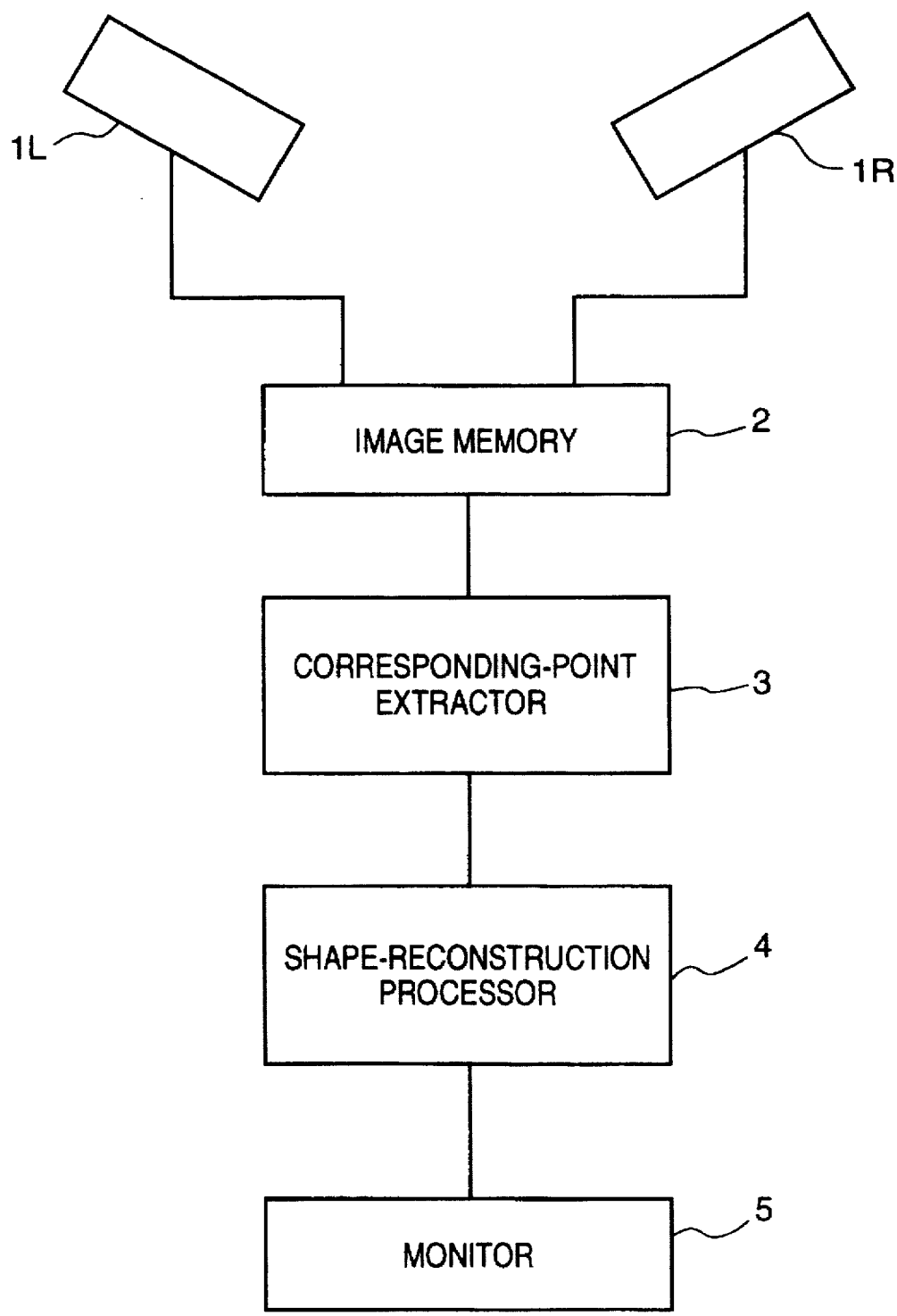
FIG. 5 is a block diagram showing the construction of a stereoscopic-information extracting system to which the present invention is applied.

FIG. 1 is a flowchart showing a corresponding-point matching method according to a first embodiment of the present invention. FIG. 5 is a block diagram showing the construction of an apparatus that performs the corresponding-point matching of the present embodiment. Note that the description will be made for a stereoscopic image, however, the corresponding-point matching of the present invention can be applied to a moving image. FIG. 1 explains the detailed processing by a corresponding-point extractor 3 in FIG. 5. Note that the following description of this embodiment is in the case of extracting points between two images which are obtained by two cameras arranged with a predetermined convergence angle and a predetermined distance therebetween and from the object. The processing program corresponding to the flowchart of FIG. 1 and the programs corresponding to the flowcharts of FIGS. 2 to 4 to be described later are stored in a ROM (not shown) of the corresponding-point extractor 3, and these programs are read and executed by a CPU (not shown).

Referring to FIG. 1, in step S1, images from right and left cameras (cameras 1R and 1L in FIG. 5) are inputted into an image memory 2, and in step S2, edge-extraction processing is performed on each image.

A known edge extraction process, e.g., a convolution operation between a predetermined size of a Gaussian kernel and an image is performed, and the result is subjected to Laplacian operation to obtain a second-order differential of the result, thereafter, zero-crossing points are detected. The present invention is not limited to a specific edge extraction method.

Generally, an edge extraction process produces spurious and unnecessary edges (due to noise in image or factors characteristic of the method). In this embodiment, unnecessary-edge elimination is performed in step S3 to eliminate these unnecessary edges. If the length of an extracted edge is shorter than a predetermined length, it is determined that the edge is unnecessary, and the edge is eliminated or ignored.

The unnecessary-edge elimination in step S3 may be replaced by a process where if the edge intensity (e.g., the sum of the absolute values of spacial differentiation of low-pass filtered images, $|\partial I^*/\partial x|+|\partial I^*/\partial y|$, ($I^*$: filtered image data)) of an extracted edge is equal to a predetermined level or lower, it is determined that the edge is an unnecessary. Note that the process of step S3 may be omitted.

Next, in step S4, the images are divided into blocks with a predetermined block size, with each pixel as the central pixel of corresponding block (standard-block dividing). In step S5, whether or not an edge exists inside of a block and whether or not an intersection of edges within any block exists is examined. If it is determined in step S6 that the result of step S5 is positive, i.e., YES, the process proceeds to step S7, in which the block size is changed to be made smaller or the shape of the block is transformed so as not to have intersections of edges within the block based on the distance between the central pixel of the block and existing edge or the existing intersection detected within the block.

If there is no edge or intersection within the block, i.e., negative or NO in step S6, processing for that specific block has been completed and the process proceeds to step S8, where it is checked whether or not the block edge and intersection removal process has been completed. If there are still blocks that have not been processed, i.e., NO in step S8, the process returns to step S4 where a new block is selected and the processing is started using an initial block size of the standard block size. Thereafter, steps S5, S6, S7 and S8 are repeated until all the blocks in the images have been processed. When this point is reached, edges and intersections of edges have been removed from all the blocks.

When the images have been completely processed by the steps S5, S6, S7 and S8, the process proceeds to step S9, in which corresponding points are extracted based on the correlation between blocks. Further, depths of respective points of the original object corresponding to the corresponding points are obtained, based on the position information on the obtained corresponding points in the respective images and based on the image-sensing position information on the position from which the images are image-sensed. The depths can be easily obtained in accordance with known methods, e.g., the principle of triangular surveying.

Next, a corresponding-point extraction method based on the similarity between blocks will be described. In this embodiment, two blocks may be different in block size, due to the above-described block-based dividing process and edge/intersection removal process. To deal with this, the central pixels of two corresponding blocks, one from each images, are brought to correspond with each other, and the similarity is calculated on overlapped portions between the blocks. Smaller blocks of one of the two images may be placed in larger blocks of the other image, and the similarity is obtained on overlapped portions in accordance with the following equations. Assuming that a block having a central pixel (i,j) is defined as "$I^k_{i,j}$" (k: image identifier of, e.g., right/left image for stereoscopic image), the similarity is obtained from:

$$c_1(i',j') = \frac{\sum_{p,q} (I^L_{i,j}(p,q) - I^R_{i',j'}(p,q))^2}{\sqrt{\sum_{p,q} (I^L_{i,j}(p,q))^2 \sum_{p',q'} (I^R_{i',j'}(p',q'))^2}} \quad (1)$$

$$c_2(i',j') = \frac{\sum_{p,q} I^L_{i,j}(p,q) \cdot I^R_{i',j'}(p,q)}{\sqrt{\sum_{p,q} (I^L_{i,j}(p,q))^2 \sum_{p',q'} (I^R_{i',j'}(p',q'))^2}} \quad (2)$$

$$c_3(i',j') = \frac{\sum ((I^L_{i,j}(p,q) - \bar{I}^L_{i,j}) - (I^R_{i',j'}(p,q) - \bar{I}^R_{i',j'}))^2}{\sqrt{\sum (I^L_{i,j}(p,q) - \bar{I}^L_{i,j})^2 \sum (I^R_{i',j'}(p,q) - \bar{I}^R_{i',j'})^2}} \quad (3)$$

$$c_4(i',j') = \frac{\sum_{p,q} (I^L_{i,j}(p,q) - \bar{I}^L_{i,j})(I^R_{i',j'}(p,q) - \bar{I}^R_{i',j'})}{\sqrt{\sum_{p,q} (I^L_{i,j}(p,q) - \bar{I}^L_{i,j})^2 \sum_{p,q} (I^R_{i',j'}(p,q) - \bar{I}^R_{i',j'})^2}} \quad (4)$$

$\bar{I}_{i,j}^L$: average value of block $I^L(i,j)$ $\bar{I}_{i',j'}^R$: average value of block $I^R(i',j')$ $I_{i,j}^L(p,q)$: Intensity (or other measurements) at a pixel (p,q) in a block having a central pixel (i,j) of the left image $I_{i',j'}^R(p,q)$: Intensity (or other measurements) at a pixel (p,q) in a block having a central pixel (i',j') of the right image In the above equations, basically $C_2$ and $C_4$ are correlation coefficients, and $C_1$ and $C_3$ denote a distance between two blocks. Regarding the coefficients $C_1$ and $C_2$, to extract corresponding points, the closest matching between the right block $I^R(i',j')$ and the left block $I^L(i,j)$ is obtained when the block $I^R(i',j')$ has the maximum value. Regarding the coefficients $C_1$ and $C_3$, the closest matching is obtained when the block $I^R(i',j')$ has the minimum value.

Accordingly, the combination of pixels ((i,j) and (i',j')) are corresponding points to be extracted.

As described above, FIG. 5 shows the construction of the stereoscopic-information extracting system having a processing unit of the present embodiment.

In FIG. 5, reference numerals 1R and 1L denote cameras; 2, an image memory, 3, the corresponding-point extractor including the processing unit executing the processing shown in FIG. 1; 4, a shape-reconstruction processor which obtains binocular disparity or a distance from corresponding points and performs appropriate interpolation to reconstruct a stereoscopic shape; and 5, a monitor for displaying the result from the reconstruction.

Figure 6A:
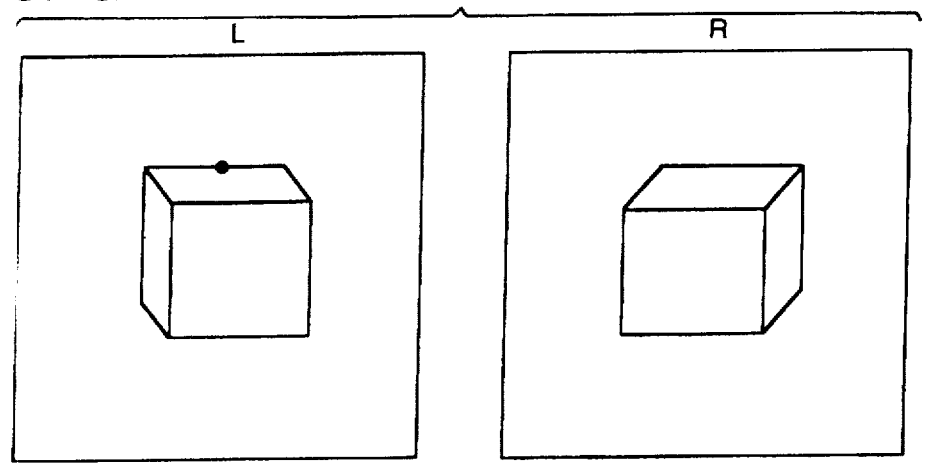
FIGS. 6A to 6C are explanatory views showing block-dividing processing.

FIG. 6A shows two images, one for the left camera and the other for the right camera. The images have been processed by the unnecessary-edge elimination procedure in step S3 of FIG. 1. Therefore, FIG. 6A shows only the relevant edges, e.g., spurious edges have been removed.

Figure 6B:
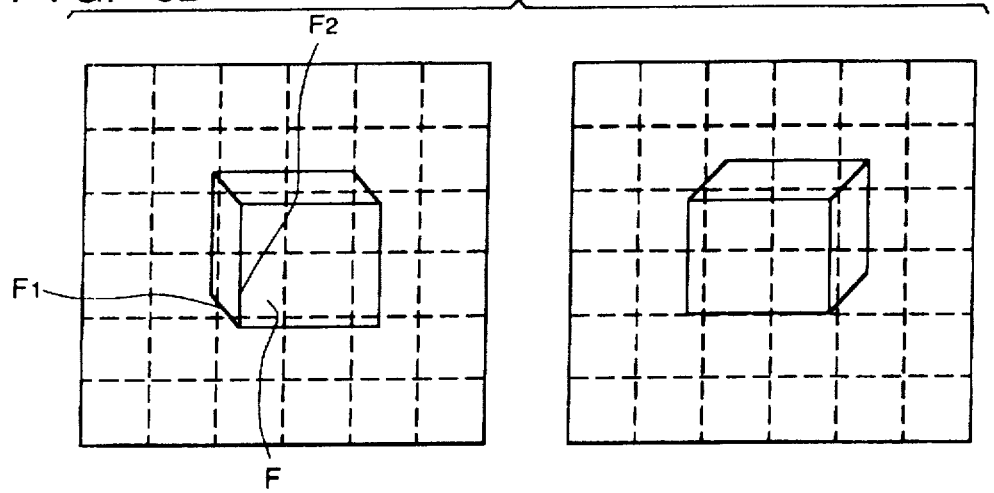

FIG. 6B shows the images divided into standard-size blocks resulting from the standard-block dividing process in step S4 of FIG. 1. Each block has a central pixel as the representative point. Since each pixel of the image is used as a central pixel, and each central pixel has an associated block, there are many blocks, each displaced by one pixel. The blocks shown in FIG. 6B are only a small subset of the entire set selected for illustration purposes since displaying a large number of blocks overlapping each other will be confusing.

Figure 6C:
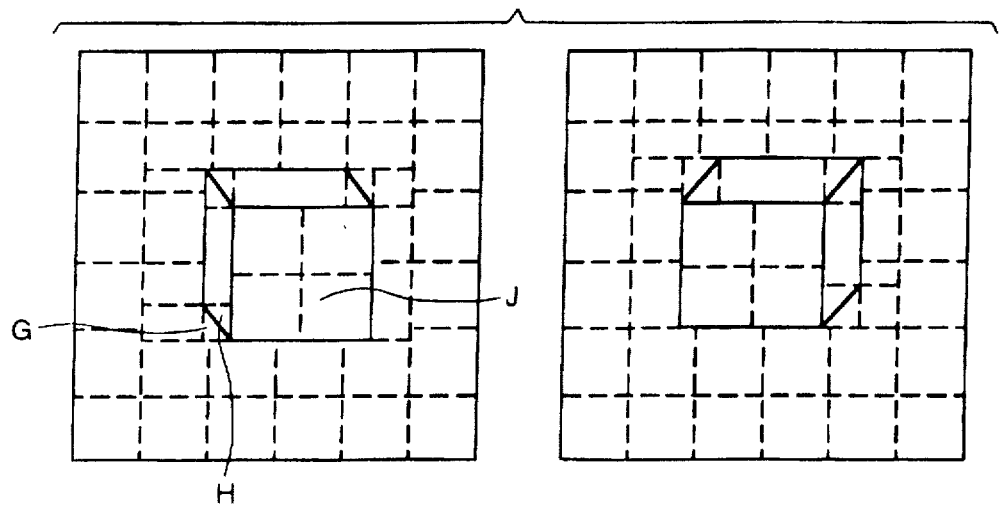

FIG. 6C shows the images after the edge and intersection of edges removal process, i.e., steps S5 through S7 of FIG. 1, has been completed so that there is no edge or intersection of edges in any of the blocks. For example, block F in FIG. 6B has two edges, i.e., $F_1$ and $F_2$. The process, steps S5 through S7, has divided the block F into three blocks, i.e., block G, H and J. The resulting blocks, G, H and J do not contain any edge or intersection of edges. In this particular case, the blocks are of rectangular or triangular (right triangular) shapes. Block G and block H are triangular while block J is a rectangular block. All the other blocks in FIG. 6C do not contain an edge or intersection of edges, therefore, FIG. 6C is the final result of the edge and intersection of edges removal process, i.e., step S8 is a YES.

As described above, according to the present embodiment, two images are respectively divided into a plurality of blocks each having no discontinuity in binocular disparity or discontinuity in a motion vector inside, similarities are calculated by pairs of blocks, and corresponding points are extracted based on the calculated similarities. Thus, even if the images include discontinuities, corresponding points are extracted in block units.

[Second Embodiment]

Next, a second embodiment of the present invention will be described with reference to the flowchart of FIG. 2. The second embodiment concentrates on how to divide the images into a plurality of blocks more properly so as to locate corresponding points between images.

Figure 2:
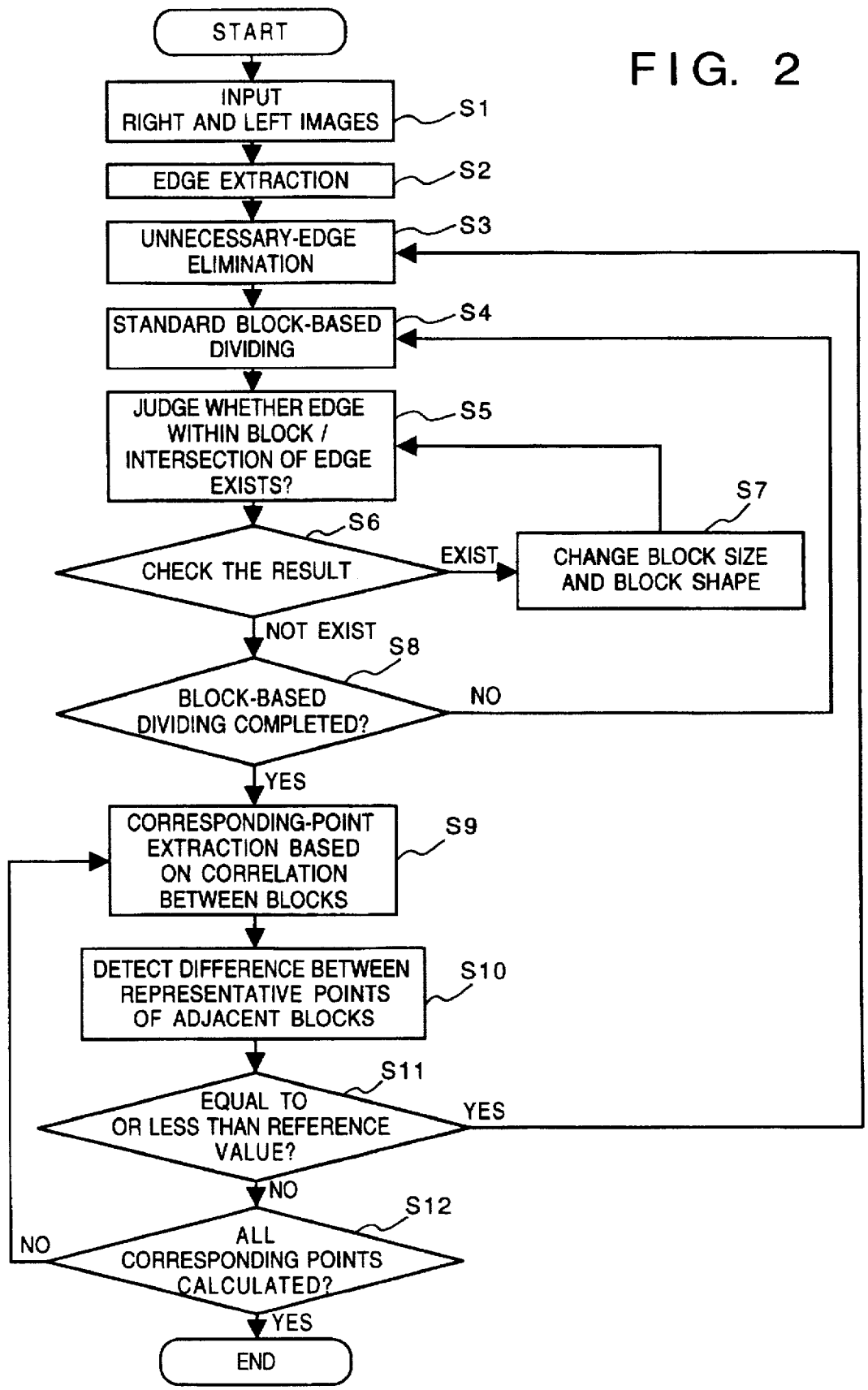
FIG. 2 is a flowchart showing processing procedure according to a second embodiment of the present invention.

Note that in FIG. 2, steps S1 to S9 are identical to those in FIG. 1, therefore, the explanations of these steps will be omitted.

In order to obtain proper blocks, the characteristic or feature vectors of two adjacent blocks are compared. Depending upon the result of such comparison, the edges at which discontinuities of the characteristic arise and/or intersections being evaluated can be further determined. Steps S10 and S11 are processes to perform this function.

In step S10, the difference between the depths of the representative points of adjacent blocks (in case of moving image, the difference between motion vectors of representative points of adjacent blocks) is obtained.

In step S11, whether or not the difference between the depths of the representative points of adjacent blocks (in case of moving image, the directional difference between motion vectors) is greater than a reference value is determined. If the difference is equal to or less than the reference value, it is determined that an edge is generated by a texture pattern of a smooth object surface, by the distribution of illumination or by the other evaluation criteria. Then the process returns to step S3, in which this edge is deleted as an unnecessary edge so as to combine the adjacent blocks into one block. If the difference is greater than the reference value, the process proceeds to step S12, in which whether or not all the corresponding points have been calculated is determined. If YES, the process ends.

Note that in step S11, if the difference is less than the reference value, the size of the adjacent blocks is enlarged, however, the process may return to step S4 without enlarging the block size, to continue another block-based dividing.

Note that in step S10, the difference between binocular disparities and the difference between motion vectors may be obtained as difference.

According to the second embodiment, the block-based dividing in such manner that a block contains an edge and that there is a intersection of edge within any block, is not necessary as described in the first embodiment, and is made such that the edge or discontinuity constitutes the border of the block.

That is, according to this embodiment, it is possible to locate corresponding points between images precisely based upon the fact that block-based dividing is performed on images so that one block may contain a discontinuity of characteristic feature (e.g., binocular disparity, motion vector), if it exists, that lies on one side of the block, not inside of the block.

[Third Embodiment]

Figure 3:
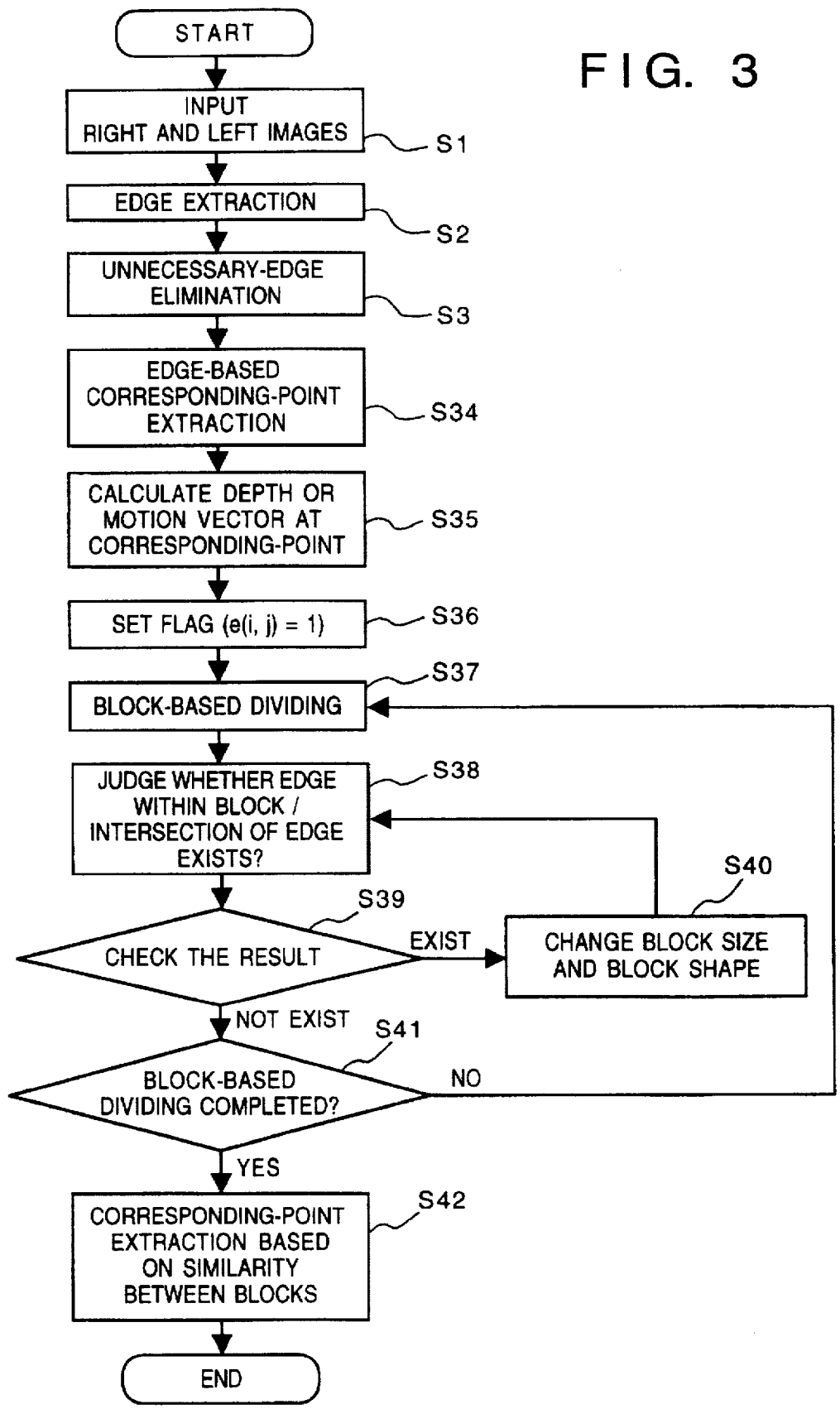
FIG. 3 is a flowchart showing processing procedure according to a third embodiment of the present invention.

Next, a third embodiment of the present invention will be described with reference to the flowchart of FIG. 3. Similar to FIG. 2, steps S1 to S3 in FIG. 3 are identical to those in FIG. 1, therefore, the explanations of these steps will be omitted.

In this embodiment, after the edge extraction (step S2) and the unnecessary-edge elimination (step S3), corresponding points are extracted based on edges or edge segments in step S4.

In step S34, corresponding points on edges of right and left images are obtained (including determination of existence/absence of corresponding point), and the depths of the obtained corresponding points (motion vectors in a case of moving image) are calculated in step S35.

In step S36, if the difference obtained as in step S10 of FIG. 2 is greater than a reference value or if there is no corresponding point, a prohibition flag or a label is set so that, upon block-based dividing, the edge or discontinuity of features cannot be held inside of any block and there is no intersection of edge with any block.

More specifically, each pixel (i,j) has a label e(i,j). The label is initialized (e(i,j)=0), set in advance. Regarding a pixel of an edge that has no corresponding point, a prohibition flag is set to one (e(i,j)=1).

In steps S37 to S40, block-based image division process is performed regarding all the blocks, until every block contains no edge and there is no intersection of edge with any block. Then when the processing has been completed (which is judged in step S41), corresponding-point extraction is performed based on similarity between blocks in step S42. In step S38, whether or not there is any edges inside of any block and any intersection of edge with any block is determined based on the value of prohibition flag.

[Fourth Embodiment]

Next, a fourth embodiment of the present invention will be described with reference to the flowchart of FIG. 4. Also in this embodiment, step S1 is identical to that in FIG. 1 and the explanation of step S1 will be omitted.

In step S42, the images are divided into blocks of a predetermined size, with each of the blocks having a representative pixel as a central pixel of each block.

In step S43, similar to the first embodiment, corresponding points are obtained based on similarity between blocks, calculated in accordance with a predetermined method.

In step S44, a difference between depths of representative points in adjacent blocks is calculated.

In step S45, if the difference calculated in step S44 is out of a reference range, it is determined that the binocular disparity (or motion vector) between the two images changes discontinuously at the pixels. Then, a discontinuity label (a prohibition flag) e(i,j) is set to "1" (similar to the second embodiment, the flag has been initialized (e(i,j)=0)).

In step S46, whether the blocks contain discontinuity is examined. If there exists a discontinuous portion satisfying (e(k,j)=1), which has a predetermined size (length) or greater, the block is identified as containing a discontinuous portion that needs further processing, and the process proceeds to step S47.

In step S47, the block size is reduced using a method reducing a block size at a predetermined ratio to, e.g. 1/2. Thereafter, the process returns to step S43 to repeat the extraction of corresponding points and evaluation of the discontinuities.

In step S48, whether or not every block contains no discontinuity inside is determined, and if NO, the process returns to step S42 to repeat the above processing and finally obtain corresponding points.

In the foregoing description, the shape of block is basically a rectangle or a square having a size of m pixels in a vertical direction and n pixels in a horizontal direction. However, this does not pose any limitation upon the present invention. The block shape may be an arbitrary polygon corresponding to the shape of the discontinuous portion. In this case, it is supposed that the center of a block (geometric center) is a representative pixel of the block.

Figure 7:
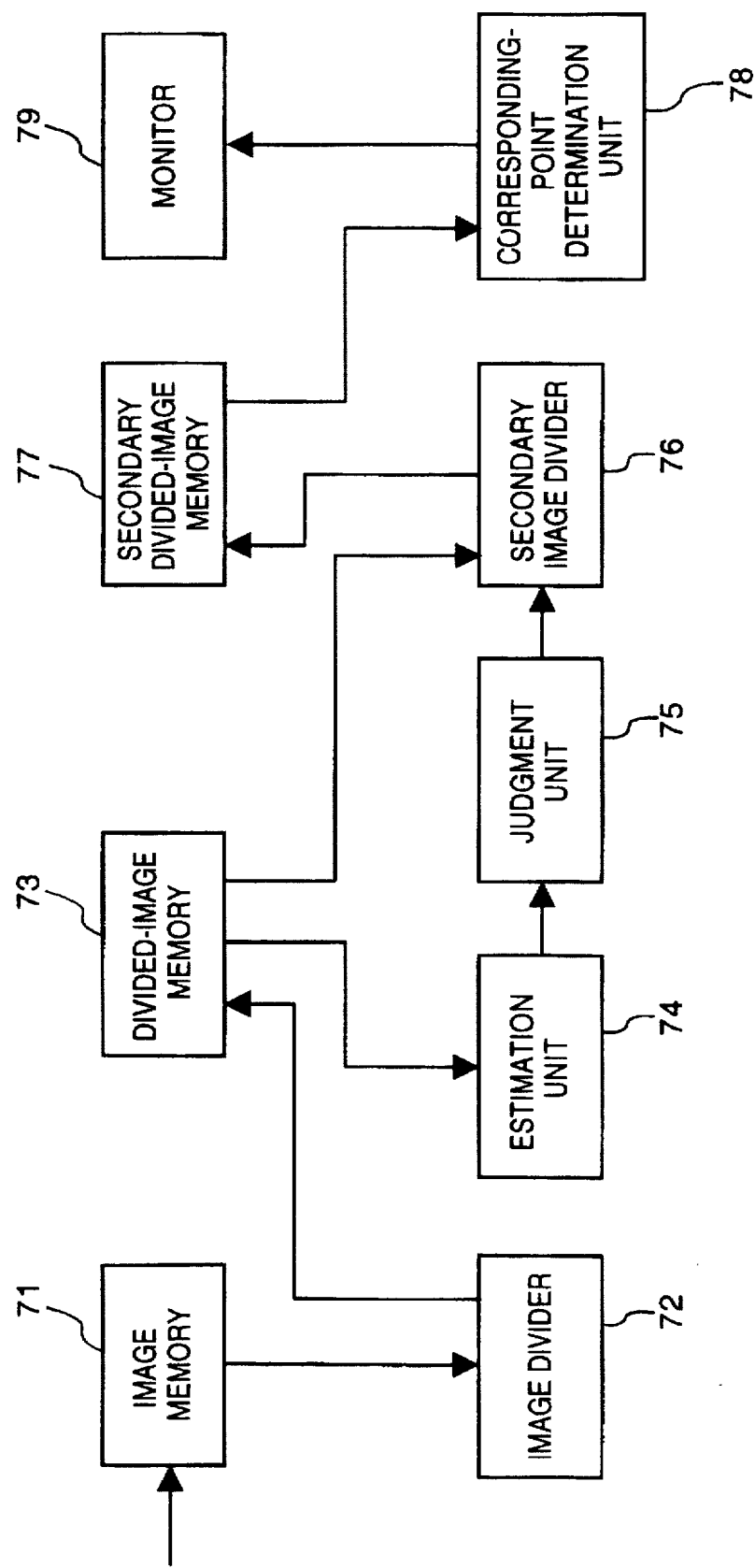
FIG. 7 is a block diagram showing the construction of a corresponding-point matching apparatus according to the present invention.

Next, an example of a corresponding-point matching apparatus of the present invention will be described with reference to FIG. 7. In FIG. 7, numeral 71 denotes an image memory; 72, an image divider; 73, a divided-image memory; 74, a estimation unit; 75, a judgment unit; 76, a secondary image divider; 77, a secondary divided-image memory; 78, a corresponding-point determination unit; and 79, a monitor.

The image memory 71 is used for storing a video signal inputted from outside. The image divider 72 divides an image stored in the image memory 71 into a predetermined number of blocks. The divided images are stored into the divided-image memory 73.

The estimation unit 74 obtains parallaxes or motion vectors between respective points in the divided images stored in the divided-image memory 73, based on similarity between each block of one image and corresponding block of another image.

The estimation unit 74 supplies the estimated values (or obtained parallaxes or motion vectors) to the judgment unit 75 at the next step. The judgment unit 75 determines whether or not the difference between the estimated values of adjacent blocks is within a reference range, and supplies the judgment to the secondary image divider 76.

The secondary image divider 76 further re-divides the divided images stored in the divided-image memory 73, based on the judgment from the judgment unit 75, and stores the divided images into the secondary divided-image memory 77.

Then, the secondary divided-image memory 78 determines corresponding points of the secondarily-divided images stored in the secondary divided-image memory 77, based on similarity between blocks. The monitor 79 displays the results of the determination.

As described above, the present invention divides images into a plurality of blocks, until every block contains no discontinuous portion of features (e.g., binocular disparity, motion vector), and there is no intersection between a discontinuous portion and any border of a block, then, calculates similarity by pair of blocks, and extracts corresponding points from the similarity. This enables block-based corresponding-point extraction with high precision even if images have a discontinuous portion of arbitrary shape or an arbitrary number of discontinuous portion.

In the above embodiments, mainly the corresponding-point extraction in case of stereoscopic image has been described, however, the corresponding-point extraction may be performed on a moving image. Both, stereoscopic image and moving image, can be processed based on substantially the same concept. That is, in stereoscopic image processing, the difference between the depths of representative points between adjacent blocks are detected and secondary block-based dividing is performed; and in case of moving image processing, the directional difference and/or the difference of velocity between the motion vectors of representative points of adjacent blocks are detected, and also secondary block-based dividing is performed.

Note that in the corresponding-point extraction, correlation between blocks is obtained based on the intensities of respective pixels, however, the correlation may be obtained based upon respective color components, e.g., R, G and B color components.

Note also that "depth" and "binocular disparity" at each point in the image as have described before are almost the same in terms of reflecting each 3-D position on an object. The "binocular disparity" in stereoscopic vision is defined as the difference in position between corresponding points of the right and left images.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for processing images for stereoscopic vision, obtained by image-sensing an object from a plurality of viewpoints, comprising:
   a division step of dividing the respective images into a plurality of blocks so as not to intersect each block's side with any edges in the images;
   a size changing step of changing a size of a block of interest by combining the block of interest with its adjacent block or blocks out of the plurality of blocks generated in said division step into one block when the block of interest has predetermined relationship with respect to the adjacent block or blocks; and
   a corresponding-point determination step of determining corresponding points between the images, each having blocks generated in said division step and said size changing step, based on similarity between one block of one image and that of another image.

2. The image processing method according to claim 1, wherein the similarity is decided based upon a distance between feature vectors of a block of one image and a block of a corresponding image.

3. The image processing method according to claim 2, wherein the feature vectors include luminance of each pixel as a feature vector's component.

4. The image processing method according to claim 2, wherein the feature vectors include densities of respective three primary color components in each pixel.

5. The image processing method according to claim 1, wherein each of the corresponding points is a predetermined point in each respective block.

6. The image processing method according to claim 1, further comprising a depth calculation step of calculating depths of respective points of the object, based on positions of the corresponding points between the images, determined in said determination step, and image-sensing positions where the object is image-sensed.

7. The image processing method according to claim 6, further comprising a block expansion step of, among representative points of adjacent blocks, if the difference between the depths of the representative points is smaller than a predetermined threshold value, the adjacent blocks are combined into a larger-sized block,
   wherein in said corresponding-point determination step, the corresponding points between the images are determined, based on the block generated in said block expansion step.

8. An image processing method of processing motion images obtained by image-sensing an object at different time points, comprising:
   a division step of dividing frame images of the motion images, each into a plurality of blocks, so as not to intersect each block's side with any edges in the images;
   a size changing step of changing a size of a block of interest by combining the block of interest with its adjacent block or blocks out of the plurality of blocks generated in said division step into one block when the block of interest has predetermined relationship with respect to the adjacent block or blocks; and
   a corresponding-point determination step of determining corresponding points between the frame images, each having blocks generated in said division step and said size changing step, based on similarity between one block of one frame image and that of a corresponding frame image.

9. The image processing method according to claim 8, wherein the similarity is decided based upon a distance between feature vectors of a block of one image and a block of a corresponding image.

10. The image processing method according to claim 9, wherein the feature vectors include luminance of each pixel as a feature vector's component.

11. The image processing method according to claim 9, wherein the feature vectors include densities of respective three primary color components in each pixel.

12. The image processing method according to claim 8, wherein each of the corresponding points is a predetermined point in each respective block.

13. The image processing method according to claim 9, further comprising a motion vector calculation step of calculating motion vectors at respective corresponding points, based on the positions of corresponding points between the frame images determined in said determination step.

14. The image processing method according to claim 13, further comprising a block expansion step of, among representative points of adjacent blocks, if the difference between the directions of the motion vectors at the representative points of the adjacent blocks is smaller than a predetermined threshold value, combining the adjacent blocks into a larger-sized block, wherein in said corresponding-point determination step, the corresponding points between the frame images are determined, based on the block generated in said block expansion step.

15. An image processing method for processing images for stereoscopic vision, obtained by image-sensing an object from a plurality of view points, comprising:

a division step of dividing the respective images into a plurality of blocks so as not to intersect each block's side with any edges in the images and so as not to include adjacent pixels whose binocular disparities differ from each other by more than a predetermined threshold value and a corresponding-point determination step of determining corresponding points between the images, each having blocks generated in said division step, based on similarity, each between one block of one image and that of another image.

16. An image processing method according to claim 15, said each block's side is generated on the basis of the difference between adjacent pixels' intensities.

17. An image processing method according to claim 15, said each block's side is generated on the basis of the difference between adjacent pixels' colors.

18. An image processing method according to claim 15, an edge based division step of dividing said images into a plurality of blocks so as not to intersect each block's side with any edges in the images;

an edge based corresponding-point determination step of determining corresponding points between the images, each having blocks generated in said division step, based on similarity, each between one block of one image and that of another image; and a generation step of generating another block by combining adjacent blocks if the difference between the binocular disparity of the representative points of the adjacent blocks is smaller than a predetermined threshold value.

19. An image processing method for processing motion images, obtained by image-sensing an object at different time points, comprising:

a division step of dividing the respective images into a plurality of blocks so as not to intersect each block's side with any edges in the images and so as not to include adjacent pixels whose motion vectors differ from each other by a predetermined threshold value and a corresponding-point determination step of determining corresponding points between the images, each having blocks generated in said division step, based on similarity, each between one block of one image and that of another image.

20. An image processing method according to claim 19, said each block's side is generated on the basis of the difference between adjacent pixels' intensities.

21. An image processing method according to claim 19, said each block's side is generated on the basis of the difference between adjacent pixels' colors.

22. An image processing method according to claim 19, an edge based division step of dividing said images into a plurality of blocks so as not to intersect each block's side with any edges in the images;

an edge based corresponding-point determination step of determining corresponding points between the images, each having blocks generated in said division step, based on similarity, each between one block of one image and that of another image; and a generation step of generating another block by combining adjacent blocks if the difference between motion vectors of the representative points of the adjacent blocks is smaller than a predetermined threshold value.

23. An image processing method according to claim 21, said motion vector is a vector connecting said corresponding points between said motion images.

24. An image processing apparatus for processing images for stereoscopic vision, obtained by image-sensing an object from a plurality of view points, comprising:

division means for dividing the respective images into a plurality of blocks so as not to intersect each block's side with any edges in the images;

size changing means for changing a size of a block of interest by combining its adjacent block or blocks out of the plurality of blocks generated by said division means into one block when the block of interest and the adjacent block or blocks have predetermined relationship; and corresponding-point determination means for determining corresponding points between the images, each having blocks generated by said division means and said size changing means, based on similarity, each between one block of one image and that of another image.

25. The image processing apparatus according to claim 24, wherein the similarity is decided based upon a distance between feature vectors of a block of one image and a block of a corresponding image.

26. The image processing apparatus according to claim 25, wherein the feature vector include luminance of each pixel as a feature vector's component.

27. The image processing apparatus according to claim 25, wherein the feature vectors include densities of respective three primary color components in each pixel.

28. The image processing apparatus according to claim 24, wherein each of the corresponding points is a predetermined point in each respective block.

29. The image processing apparatus according to claim 24, further comprising a depth calculation means for calculating depths of respective points of the object, based on positions of the corresponding points between the images, determined in said determination means, and image-sensing positions where the object is image-sensed.

30. The image processing apparatus according to claim 29, further comprising a block expansion means of, among representative points of adjacent blocks, if the difference between the depths of the representative points is smaller than a predetermined threshold value, the adjacent blocks are combined into a larger-sized block, wherein in said corresponding-point determination means, the corresponding points between the images are determined, based on the block generated in said block expansion means.

31. An image processing apparatus of processing motion images obtained by image-sensing an object at different time points, comprising:

division means for dividing frame images of the motion images, each into a plurality of blocks, so as not to intersect each block's side with any edges in the images;

size changing means for changing a size of a block of interest by combining its adjacent block or blocks out of the plurality of blocks generated by said division means into one block when the block of interest and the adjacent block or blocks have predetermined relationship; and corresponding-point determination means for determining corresponding points between the frame images, each having blocks generated by said division means and said size changing means, based on similarity between one block of one frame image and that of a corresponding frame image.

32. The image processing apparatus according to claim 31, wherein the similarity is decided based upon a distance between feature vectors of a block of one image and a block of a corresponding image.

33. The image processing apparatus according to claim 32, wherein the feature vectors include luminance of each pixel as a feature vector's component.

34. The image processing apparatus according to claim 32, wherein the feature vectors include densities of respective three primary color components in each pixel.

35. The image processing apparatus according to claim 31, wherein each of the corresponding points is a predetermined point in each respective block.

36. The image processing apparatus according to claim 32, further comprising a motion vector calculation means for calculating motion vectors at respective corresponding points, based on the positions of corresponding points between the frame images determined in said determination means.

37. The image processing apparatus according to claim 36, further comprising a block expansion means of, among representative points of adjacent blocks, if the difference between the directions of the motion vectors at the representative points of the adjacent blocks is smaller than a predetermined threshold value, combining the adjacent blocks into a larger-sized block, wherein in said corresponding-point determination means, the corresponding points between the frame images are determined, based on the block generated in said block expansion means.

38. An image processing apparatus for processing images for stereoscopic vision, obtained by image-sensing an object from a plurality of view points, comprising:

a division means for dividing the respective images into a plurality of blocks so as not to intersect each block's side with any edges in the images and so as not to include adjacent pixels whose binocular disparities differ from each other by more than a predetermined threshold value and a corresponding-point determination means for determining corresponding points between the images, each having blocks generated in said division means, based on similarity, each between one block of one image and that of another image.

39. An image processing apparatus according to claim 38, said each block's side is generated on the basis of the difference between adjacent pixels' intensities.

40. An image processing apparatus according to claim 38, said each block's side is generated on the basis of the difference between adjacent pixels' colors.

41. An image processing apparatus according to claim 38, an edge based division means for dividing said images into a plurality of blocks so as not to intersect each block's side with any edges in the images;

an edge based corresponding-point determination means for determining corresponding points between the images, each having blocks generated in said division means, based on similarity, each between one block of one image and that of another image; and a generation means for generating another block by combining adjacent blocks if the difference between the binocular disparity of the representative points of the adjacent blocks is smaller than a predetermined threshold value.

42. An image processing apparatus for processing motion images, obtained by image-sensing an object at different time points, comprising:

a division means for dividing the respective images into a plurality of blocks so as not to intersect each block's side with any edges in the images and so as not to include adjacent pixels whose motion vectors differ from each other by more than a predetermined threshold value and a corresponding-point determination means for determining corresponding points between the images, each having blocks generated in said division means, based on similarity, each between one block of one image and that of another image.

43. An image processing apparatus according to claim 42, said each block's side is generated on the basis of the difference between adjacent pixels' intensities.

44. An image processing apparatus according to claim 42, said each block's side is generated on the basis of the difference between adjacent pixels' colors.

45. An image processing apparatus according to claim 42, an edge based division means for dividing said images into a plurality of blocks so as not to intersect each block's side with any edges in the images;

an edge based corresponding-point determination means for determining corresponding points between the images, each having blocks generated in said division means, based on similarity, each between one block of one image and that of another image; and a generation means for generating another block by combining adjacent blocks if the difference between motion vectors of the representative points of the adjacent blocks is smaller than a predetermined threshold value.

46. An image processing apparatus according to claim 44, said motion vector is a vector connecting said corresponding points between said motion images.

47. An image processing method for processing stereo images obtained by sensing an object from a plurality of view points, comprising:

a first dividing step of dividing each of the stereo images into a plurality of blocks of a predetermined size;

a first corresponding point determining step of determining corresponding points between the stereo images divided in said dividing step, on the basis of similarity between a block of one stereo image and a block of another stereo image;

a parallax distribution extracting step of extracting a distribution of parallax between the corresponding points;

a discontinuous boundary line extracting step of detecting a discontinuous boundary line in the distribution of parallax;

a second dividing step of re-dividing each image of the stereo images into a plurality of blocks so as not to include the discontinuous boundary line in each block; and a second corresponding point determining step of determining corresponding points between the stereo images re-divided in said second dividing step, on the basis of similarity between a block of one stereo image and a block of another stereo image.

48. The image processing method according to claim 47, wherein the similarity is decided based upon a distance between feature vectors of a block of one image and a block of a corresponding image.

49. The image processing method according to claim 48, wherein the feature vector include luminescence of each pixel as a feature vector's component.

50. The image processing method according to claim 48, wherein the feature vectors include densities of respective three primary color components in each pixel.

51. The image processing method according to claim 47, wherein each of the corresponding points is a predetermined point in each respective block.

52. The image processing method according to claim 47, further comprising a depth calculation step of calculating depths of respective points of the object, based on positions of the corresponding points between the images, determined in said determination steps, and image-sensing positions where the object is image-sensed.

53. The image processing method according to claim 52, further comprising a block expansion of, among representative points of adjacent blocks, if the difference between the depths of the representative points is smaller than a predetermined threshold value, the adjacent blocks are combined into a larger-sized block, wherein in said corresponding-point determination steps, the corresponding points between the images are determined, based on the block generated in said block expansion step.

54. An image processing apparatus for processing stereo images obtained by sensing an object from a plurality of view points, comprising:

first dividing means for dividing each of the stereo images into a plurality of blocks of a predetermined size;

first corresponding point determining means for determining corresponding points between the stereo images, divided by said first dividing means, on the basis of similarity between a block of one stereo image and a block of the other stereo image;

parallax distribution extracting means for extracting a distribution of parallax between the corresponding points;

discontinuous boundary line extracting means for detecting a discontinuous boundary line in the distribution of parallax;

a second dividing means for dividing each image of the stereo images into a plurality of blocks so as not to include the discontinuous boundary line in each block; and a second corresponding point determining means for determining corresponding points between the stereo images, divided by said second dividing means, on the basis of similarity between a block of one stereo image and a block of the other stereo image.

55. The image processing apparatus according to claim 54, wherein the similarity is decided based upon a distance between feature vectors of a block of one image and a block of a corresponding image.

56. The image processing apparatus according to claim 55, wherein the feature vectors include luminescence of each pixel as a feature vector's component.

57. The image processing apparatus according to claim 55, wherein the feature vectors include densities of respective three primary color components in each pixel.

58. The image processing apparatus according to claim 54, wherein each of the corresponding points is a predetermined point in each respective block.

59. The image processing apparatus according to claim 54, further comprising a depth calculation means for calculating depths of respective points of the object, based on positions of the corresponding points between the images, determined by said determination means, and image-sensing positions where the object is image-sensed.

60. The image processing apparatus according to claim 59, further comprising a block expansion means of, among representative points of adjacent blocks, if the difference between the depths of the representative points is smaller than a predetermined threshold value, the adjacent blocks are combined into a larger-sized block, wherein in said corresponding-point determination means, the corresponding points between the images are determined, based on the block generated in said block expansion means.

61. An image processing method for processing a motion image obtained by sensing an object at different times, comprising:

a first dividing step of dividing each of the motion image into a plurality of blocks of a predetermined size;

a first corresponding point determining step of determining corresponding points between each image of the motion image, divided in said first dividing step, on the basis of similarity between a block of one image of the motion image and a block of another image of the motion image;

a vector distribution extracting step of extracting a distribution of movement vectors between the corresponding points determined in said first corresponding point determining step;

a discontinuous boundary line extracting step of detecting a discontinuous boundary line in the distribution of movement vectors;

a second dividing step of dividing each image of the motion image into a plurality of blocks so as not to include the discontinuous boundary line in each block; and a second corresponding point determining step of determining corresponding points between each image of the motion image, divided in said second dividing step, on the basis of similarity between a block of one image of the motion image and a block of another image of the motion image.

62. The image processing method according to claim 61, wherein the similarity is decided based upon a distance between feature vectors of a block of one image and a block of a corresponding image.

63. The image processing method according to claim 62, wherein the feature vectors include luminescence of each pixel as a feature vector's component.

64. The image processing method according to claim 62, wherein the feature vectors include densities of respective three primary color components in each pixel.

65. The image processing method according to claim 61, wherein each of the corresponding points is a predetermined point in each respective block.

66. The image processing method according to claim 61, further comprising a depth calculation step of calculating depths of respective points of the object, based on positions of the corresponding points between the images, determined in said determination steps, and image-sensing positions where the object is image-sensed.

67. The image processing method according to claim 66, further comprising a block expansion of, among representative points of adjacent blocks, if the difference between the depths of the representative points is smaller than a predetermined threshold value, the adjacent blocks are combined into a larger-sized block, wherein in said corresponding-point determination steps, the corresponding points between the images are determined, based on the block generated in said block expansion step.

68. An image processing apparatus for processing a motion image obtained by sensing an object at different times, comprising:

first dividing means for dividing each of the motion image into a plurality of blocks of a predetermined size;

first corresponding point determining means for determining corresponding points between each image of the motion image, divided by said first dividing means, on the basis of similarity between a block of one image of the motion image and a block of another image of the motion image;

vector distribution extracting means for extracting a distribution of movement vectors between the corresponding points determined by said first corresponding point determining means;

discontinuous boundary line extracting means for detecting a discontinuous boundary line in the distribution of movement vectors;

second dividing means for dividing each image of the motion image into a plurality of blocks so as not to include the discontinuous boundary line in each block; and second corresponding point determining means for determining corresponding points between each image of the motion image, divided by said second dividing means, on the basis of similarity between a block of one image of the motion image and a block of another image of the motion image.

69. The image processing apparatus according to claim 68, wherein the similarity is decided based upon a distance between feature vectors of a block of one image and a block of a corresponding image.

70. The image processing apparatus according to claim 69, wherein the feature vectors include luminescence of each pixel as a feature vector's component.

71. The image processing apparatus according to claim 69, wherein the feature vectors include densities of respective three primary color components in each pixel.

72. The image processing apparatus according to claim 68, wherein each of the corresponding points is a predetermined point in each respective block.

73. The image processing apparatus according to claim 68, further comprising a depth calculation means for calculating depths of respective points of the object, based on positions of the corresponding points between the images, determined by said determination means, and image-sensing positions where the object is image-sensed.

74. The image processing apparatus according to claim 73, further comprising a block expansion means of, among representative points of adjacent blocks, if the difference between the depths of the representative points is smaller than a predetermined threshold value, the adjacent blocks are combined into a larger-sized block, wherein in said corresponding-point determination means, the corresponding points between the images are determined, based on the block generated in said block expansion means.

* * * * *